US007479360B2

(12) United States Patent
Yasumatsu et al.

(10) Patent No.: US 7,479,360 B2
(45) Date of Patent: Jan. 20, 2009

(54) ELECTRIC CHARGE CONTROLLING AGENT, TONER FOR DEVELOPING ELECTROSTATIC CHARGE IMAGE CONTAINING THE SAME, AND METHOD FOR FORMING IMAGE USING THE TONER

(75) Inventors: Masashi Yasumatsu, Neyagawa (JP); Kazuyoshi Kuroda, Neyagawa (JP); Osamu Yamate, Neyagawa (JP); Kaori Sato, Neyagawa (JP); Jun Hikata, Neyagawa (JP); Heihachi Yushina, Neyagawa (JP)

(73) Assignee: Orient Chemical Industries, Ltd., Osaka (JP)

( * ) Notice: Subject to any disclaimer, the term of this patent is extended or adjusted under 35 U.S.C. 154(b) by 317 days.

(21) Appl. No.: 10/536,404

(22) PCT Filed: Nov. 25, 2003

(86) PCT No.: PCT/JP03/14994

§ 371 (c)(1),
(2), (4) Date: Aug. 25, 2005

(87) PCT Pub. No.: WO2004/049076

PCT Pub. Date: Jun. 10, 2004

(65) Prior Publication Data

US 2006/0154165 A1 Jul. 13, 2006

(30) Foreign Application Priority Data

Nov. 27, 2002 (JP) ............................ 2002-344218

(51) Int. Cl.
*G03G 9/097* (2006.01)
*C07F 15/02* (2006.01)

(52) U.S. Cl. .................................... 430/108.3; 534/692

(58) Field of Classification Search .............. 430/108.3; 534/692

See application file for complete search history.

(56) References Cited

U.S. PATENT DOCUMENTS 4,623,606 A 11/1986 Ciccarelli ................... 430/110
4,624,907 A * 11/1986 Niimura et al. ......... 430/108.23
6,030,737 A 2/2000 Ugai et al.
6,197,467 B1 * 3/2001 Yamanaka et al. ..... 430/108.23
2001/0004667 A1 6/2001 Okubo et al. ............... 534/692

FOREIGN PATENT DOCUMENTS

JP 61-155464 7/1986
JP 7-114218 A 5/1995
JP 10-186713 A 7/1998
JP 2002-82480 A 3/2002
JP 2004-199039 7/2004

* cited by examiner

*Primary Examiner*—John L Goodrow
(74) *Attorney, Agent, or Firm*—Steptoe & Johnson LLP

(57) ABSTRACT

The charge control agent comprises aggregate particles including an azo-type iron complex salt represented by the following chemical formula [VI]

[VI]

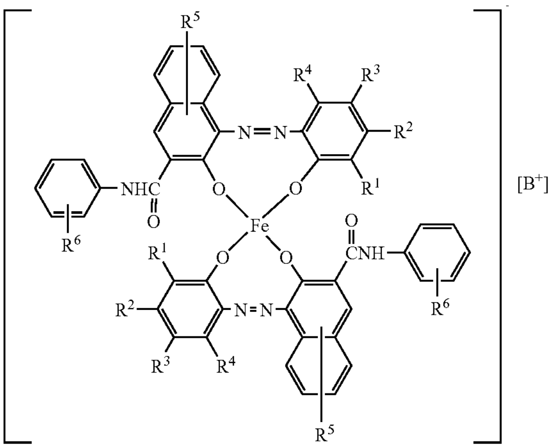

(in the chemical formula [VI], $B^+$ is $(H^+)_x(Na^+)_{1-x}$ and x is mole ratio and 0.6 to 0.9, or $B^+$ is $(H^+)_y(Na^+)_{1-y}$ and y is mole ratio and 0 to 0.2) and the aggregate particles have 0.5 to 5.0 microns of an average particle size. A toner for developing an electrostatic image comprises a resin for the toner and the charge control agent. An image formation process of electrophotography comprises a step for developing an electrostatic latent image on an electrostatic latent image frame by a developer including the toner.

27 Claims, 3 Drawing Sheets

ELECTRIC CHARGE CONTROLLING AGENT, TONER FOR DEVELOPING ELECTROSTATIC CHARGE IMAGE CONTAINING THE SAME, AND METHOD FOR FORMING IMAGE USING THE TONER

TECHNICAL FIELD

This invention relates to a negative charge control agent including azo-type iron complex, which is used for a toner for an electrostatic image development or a powder paint, and the toner for an electrostatic image development including the agent. And this invention relates to an image formation process using this toner.

BACKGROUND ART

An image formation process of an electro photography system applied to a copy machine, a printer or a facsimile performs to develop an electrostatic latent image on photosensitive frame by toner having frictional electrification, and transfer the imaged toner and then fix onto a paper.

A charge control agent is added to the toner beforehand so as for the toner to quicken a rise speed of the electrification, electrify sufficiently, control a proper quantity of the electrification stably, improve electrification property, rise up a speed for developing the electrostatic latent image, and form the vivid images. For instance, as the negative charge control agent, metallic complex salt are mentioned in Japanese Patent Provisional Publication No. 61-155464.

In recent year, a copy machine and a printer cause high efficiency with improving resolution and so on. The electro photography system is used with not only a high speed development but also a low speed development for widespread purposes. Therefore, it is required that the charge control agent causes faster rise speed of the electrification of the toner, more excellent electrification property, the agent is able to form the vivid images of high resolution, and the agent is able to be manufactured simply. And it is required that the charge control agent is able to be used of a powder paint for an electrostatic powder printing method which attracts and bakes the electrostatic powder paint onto a surface of a frame work having charge.

The present invention has been developed to solve the foregoing problems.

It is an object of the present invention to provide the charge control agent manufactured simply, and its manufacturing method. The charge control agent causes the fast rise speed of the electrification, excellent electrification property, making to form the vivid images of high resolution. It is another object of the present invention to provide the toner for electrostatic image development including this agent, and the images formation process of an electro photography system using this toner.

DISCLOSURE OF INVENTION

The charge control agent of the present invention developed for accomplishing the foregoing object comprises:

aggregate particles including an azo-type iron complex salt represented by the following chemical formula [VI]

[VI]

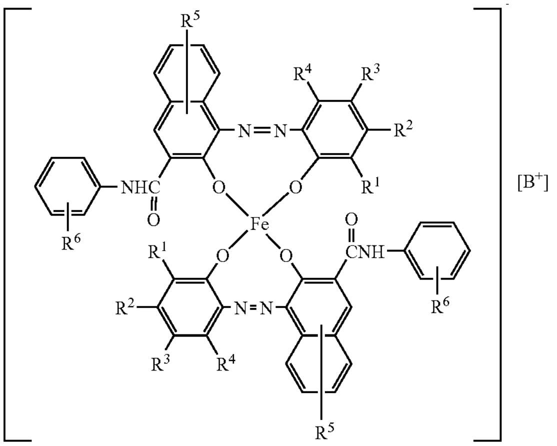

(in the chemical formula [VI], $R^1$—, $R^2$—, $R^3$— and $R^4$— are same or different to each other, and one thereof is selected from the group consisting of a hydrogen atom, an alkyl group having a straight or branch chain of 1 to 18 carbon atoms, an alkenyl group having a straight or branch chain of 2 to 18 carbon atoms, a sulfonamide group being to have substitutional groups, a mesyl group, a hydroxyl group, an alkoxyl group having 1 to 18 carbon atoms, an acetylamino group, a benzoylamino group, a halogen atom, a nitro group and an aryl group being to have substitutional groups; $R^5$— is a hydrogen atom, an alkyl group having a straight or branch chain of 1 to 18 carbon atoms, a hydroxyl group or an alkoxyl group having 1 to 18 carbon atoms; $R^6$— is a hydrogen atom, an alkyl group having a straight or branch chain of 1 to 18 carbon atoms, a hydroxyl group, a carboxyl group, a halogen atom or an alkoxyl group having 1 to 18 carbon atoms; $B^+$ is $(H^+)_x(Na^+)_{1-x}$ and x is mole ratio and 0.6 to 0.9, or $B^+$ is $(H^+)_y(Na^+)_{1-y}$ and y is mole ratio and 0 to 0.2) and said aggregate particles have 0.5 to 5.0 microns of an average particle size.

A toner for electrostatic image development prepared with the charge control agent, that comprises the azo-type iron complex salt having the counter ions of the hydrogen ion and the sodium ion ranging the above ratio, causes fast rise speed of the electrification under the high and low speed development of the electrostatic latent image. Further the toner causes electrifying sufficient quantity of charge and keeping stable electrification. If x and y of the mole ratio are out of the above range, the toner causes a lower rise speed of the electrification under the lower speed development of the electrostatic latent image, and the toner causes electrifying insufficient quantity of charge. It is further preferable that x of the mole ratio is 0.8 to 0.9, or y of the mole ratio is 0.05 to 1.0.

A common main skeleton of an anion component of the azo-type iron complex salt is represented by the following structural formula [VII]:

[VII]

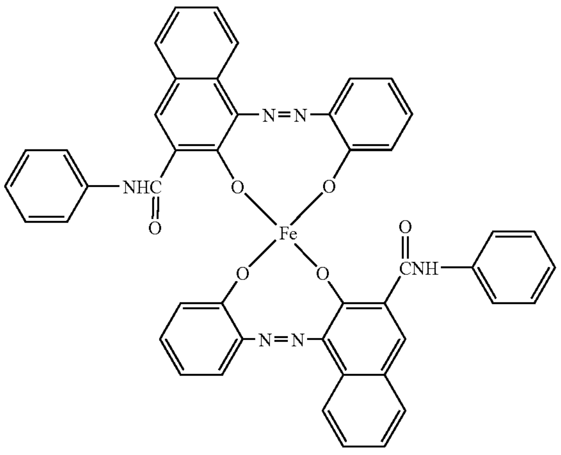

The skeleton has a central metal of an iron atom, and a metal-chelating structure with 2 molar equivalents of the monoazo compound and 1 molar equivalent of iron atom. The monoazo compound has a naphthalene ring. A hydrogen atom of the naphthalene ring is substituted by an anilide group represented by the following group [VIII]:

[VIII]

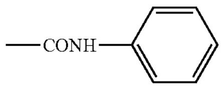

Each of the monoazo compounds having the naphthalene ring substituted by the anilide group and the azo-type iron complex salt derived from thereof improves oil insolubility, and turns out pigment.

It is difficult to prepare the azo-type iron complex salt by reason of tendency to react among solids. And the salt is difficult to crystallize. Further the salt tends to disperse heterogeneously by reason of lowering of compatibility with the toner resin. For obtaining the toner having excellent charge controlling property and well developing property on the occasion of preparing a toner by kneading of the azo-type iron complex salt and a resin for the toner, it is important that the azo-type iron complex salt is still finer particle, and dispersed homogeneously.

The azo-type iron complex salt represented by the above chemical formula [VI] is as follows.

$R^1$—, $R^2$—, $R^3$— and $R^4$— are same or different to each other, and one thereof is selected from the group consisting of the hydrogen atom; the alkyl group having the straight or branch chain of 1 to 18 carbon atoms such as methyl group, ethyl group, propyl group, isopropyl group, n-butyl group, tert-butyl group, n-pentyl group, isopentyl group, hexyl group, heptyl group or octyl group; the alkenyl group having the straight or branch chain of 2 to 18 carbon atoms such as vinyl group, allyl group, propenyl group or butenyl; the sulfonamide group being to have substitutional groups; the mesyl group; the hydroxyl group; the alkoxyl group having 1 to 18 carbon atoms such as methoxyl group, ethoxyl group, propoxyl group; the acetylamino group; the benzoylamino group; the halogen atom such as fluorine atom, chlorine atom or bromine atom; the nitro group; the aryl group being to have substitutional group such as phenyl group or naphthyl group which may have a few substitutional group such as hydroxyl group, alkyl group, aryl group or halogen atom for example fluorine atom, chlorine atom, bromine atom.

$R^5$— is selected from the group consisting of the hydrogen atom; the alkyl group having the straight or branch chain of 1 to 18 carbon atoms such as methyl group, ethyl group, propyl group, isopropyl group, n-butyl group, tert-butyl group, n-pentyl group, isopentyl group, hexyl group, heptyl group or octyl group; the hydroxyl group; and the alkoxyl group of 1 to 18 carbon atoms such as methoxyl group, ethoxyl group, propoxyl group.

$R^6$— is selected from the group consisting of the hydrogen atom; the alkyl group having the straight or branch chain of 1 to 18 carbon atoms such as methyl group, ethyl group, propyl group, isopropyl group, n-butyl group, tert-butyl group, n-pentyl group, isopentyl group, hexyl group, heptyl group or octyl group; the hydroxyl group; the carboxyl group; the halogen atom; and the alkoxyl group of 1 to 18 carbon atoms such as methoxyl group, ethoxyl group, propoxyl group.

An example of the azo-type iron complex salt represented by the above chemical formula [VI] is a compound represented by the following chemical formula [I]:

[I]

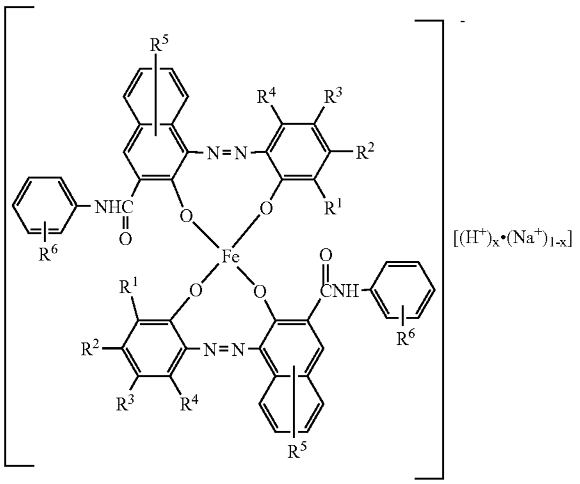

More concrete example of the azo-type iron complex salt represented by the above chemical formula [I]is a compound represented by the following chemical formula [III]:

[III]

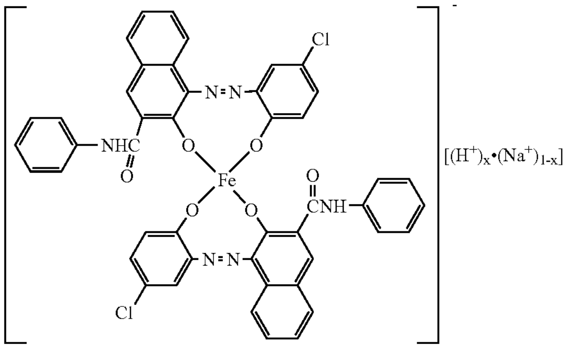

(in the chemical formula [III], x is the same above).

The other concrete examples of the azo-type iron complex salt represented by the above chemical formula [I] are compounds represented by the following chemical formulae [IX]-[XVI]:
[IX]
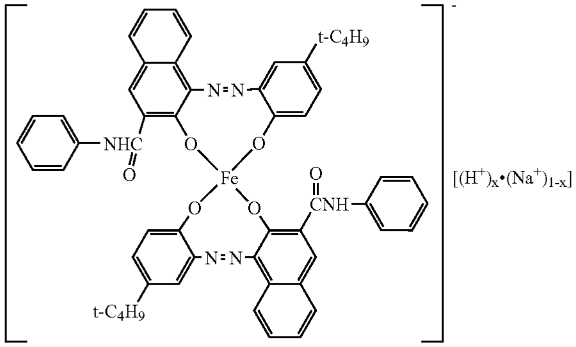
(in the chemical formula [IX], $t\text{-}C_4H_9$ is tert-butyl group)
[X]
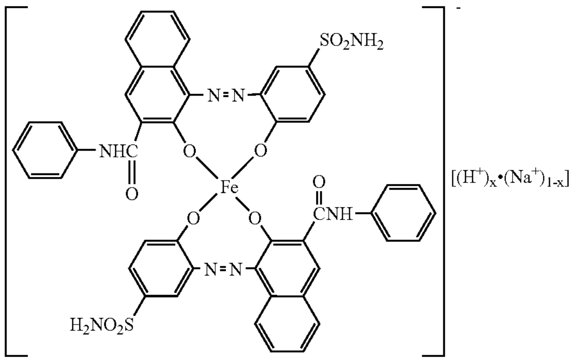
[XI]
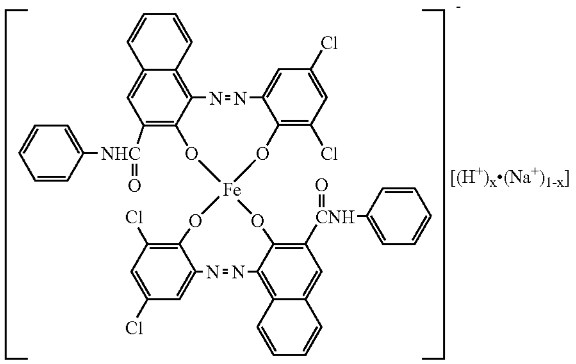
-continued
[XII]
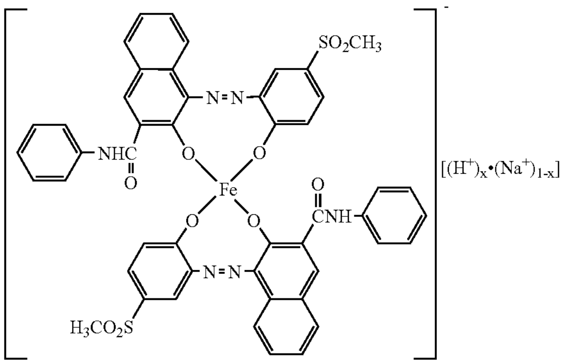
[XIII]
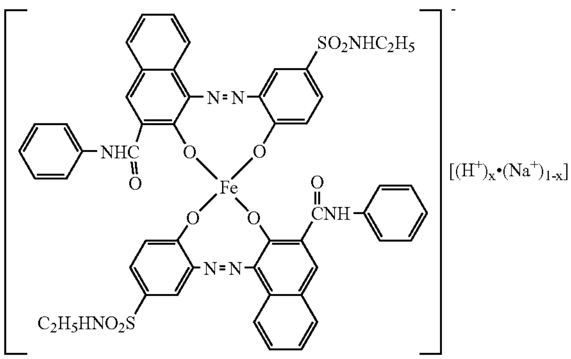
[XIV]
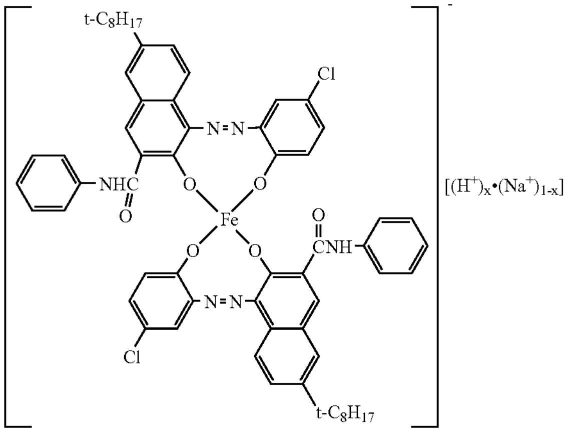
(in the chemical formula [XIV], $t\text{-}C_8H_{17}$ is tert-octyl group)

[XV]

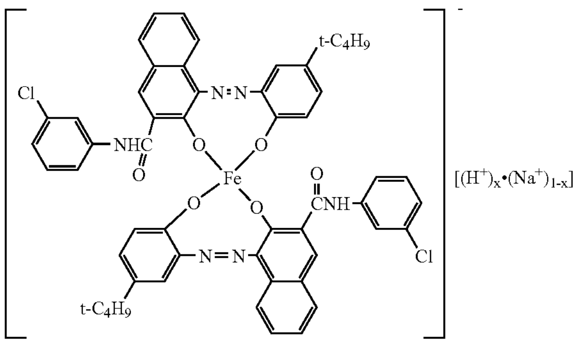

[XVI]

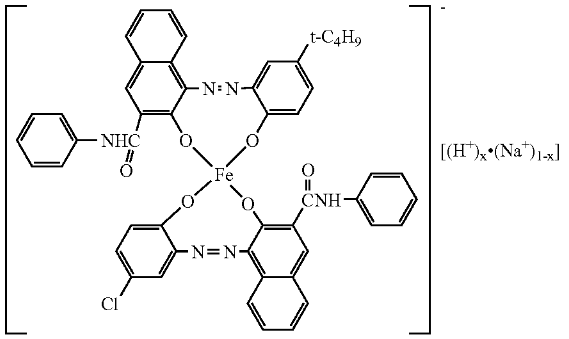

(in the chemical formulae [IX]-[XVI], x is the same above).

Especially the compound represented by the above chemical formula [III] is furthermore preferable.

Another example of the azo-type iron complex salt represented by the above chemical formula [VI] is a compound represented by the following chemical formula [II]:

[II]

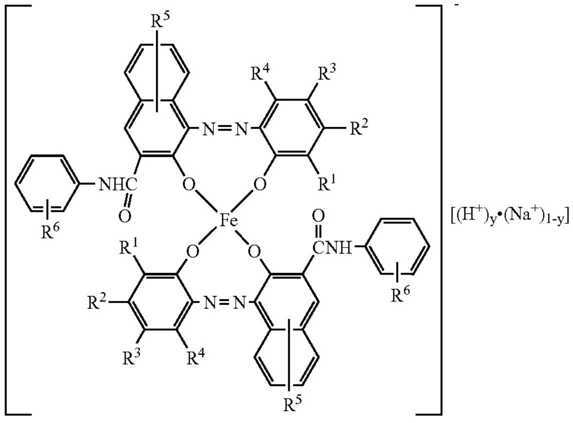

More concrete example of the azo-type iron complex salt represented by the above chemical formula [II] is a compound represented by the following chemical formula [IV]:

[IV]

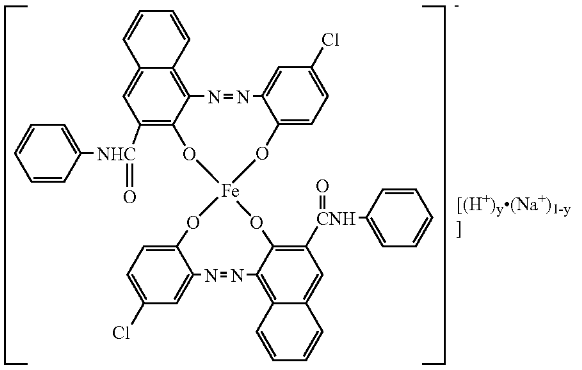

(in the chemical formula [IV], y is the same above).

The other concrete examples of the azo-type iron complex salt represented by the above chemical formula [II] are compounds represented by the following chemical formulae [XVII]-[XXIV]:

[XVII]

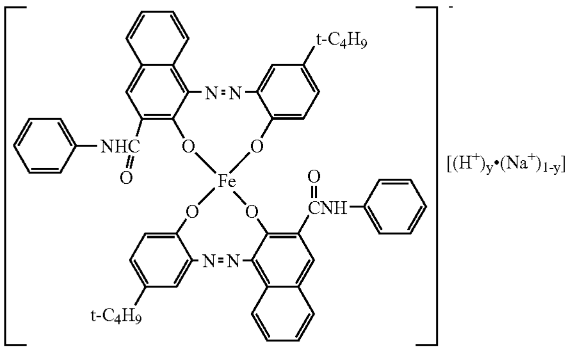

(in the chemical formula [XVII], $t\text{-}C_4H_9$ is tert-butyl group)

[XVIII]

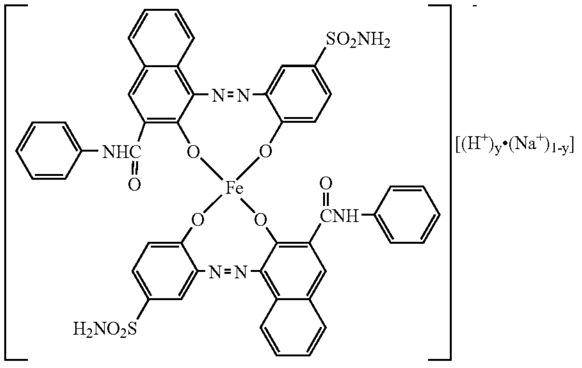

-continued

[XIX]

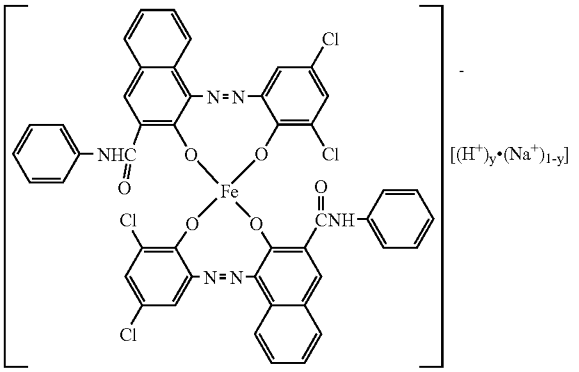

[XX]

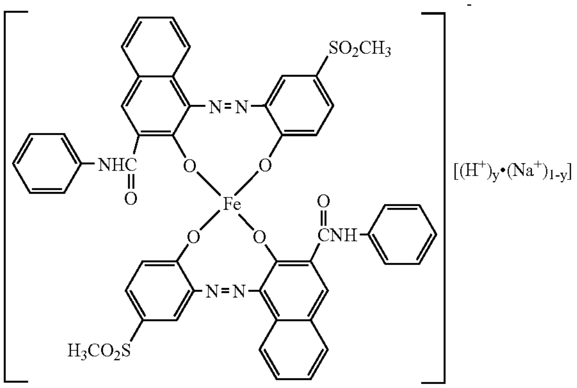

[XXI]

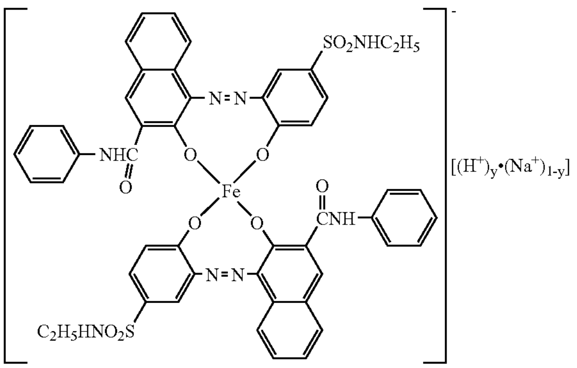

-continued

[XXII]

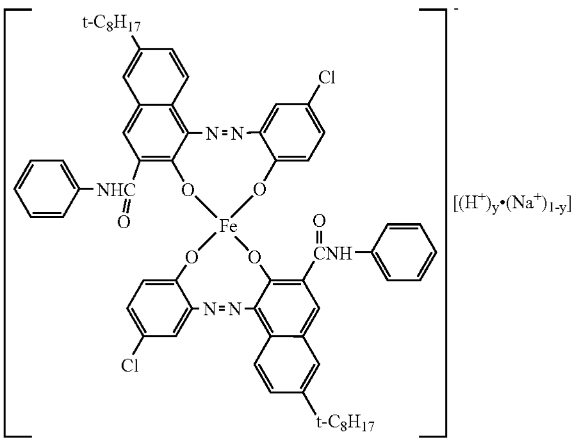

(in the chemical formula [XXII], t-$C_8H_{17}$ is tert-octyl group)

[XXIII]

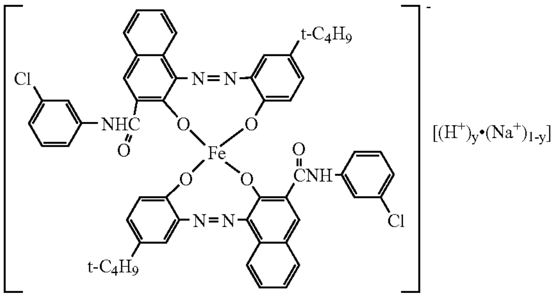

[XXIV]

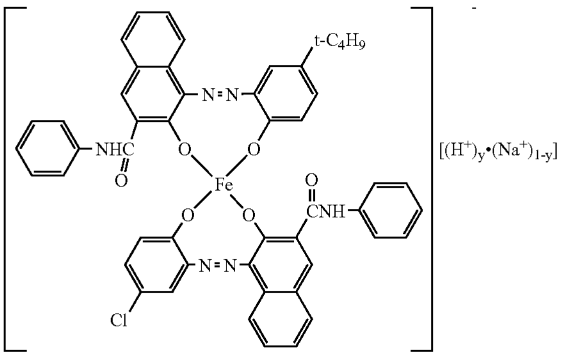

(in the chemical formulae [XVII]-[XXIV], y is the some above).

Especially the compound represented by the following chemical formula [IV] is furthermore preferable.

The charge control agent of the aggregate particles has 0.5 to 5 microns of an average particle size.

When a toner for electrostatic image development having the several micrometer particle size, that is prepared by melt-kneading the fine charge control agent within this range of the average particle size and the resin for the toner, is magnified with a scanning electron microscope, it is observed that the charge control agent is dispersed homogeneously into the particles of the toner. Consequently the toner, that the charge control agent is exposed sufficiently on the surface thereof, causes the equal and excellent electrification property.

It is preferable that the charge control agent has the average particle size ranging from 1 to 3 microns. It causes excellent dispersibility on the occasion of preparing the polymerized toner.

If the average particle size of the aggregate particles of the charge control agent is more than 5 microns, the toner causes decreasing of the dispersibility and electrification property thereof.

When the charge control agent is magnified with the scanning electron microscope, it is observed as uniform shape. Since the toner comprising the uniform charge control agent causes homogeneous electrification property, the electrostatic latent images are formed evenly and vividly.

The charge control agent of the aggregate particles is formed by association of several superfine primary particle crystalline.

It is preferable that the particle size of the primary particulate crystalline prepared by fine dispersion of the aggregate particles with ultrasonic vibration is at most 4 microns. If the particle size of the primary particulate crystalline is more than this range, the average particle of the charge control agent of the above-mentioned aggregate particles is more than 5 microns.

It is preferable that the specific surface area determined from the average particle size of the primary particulate crystalline is at least 10 $m^2/g$. When it is within this range, the charge control property of the charge control agent is improved to obtain the images having high resolution. It is more preferable that the specific surface area is at least 15 $m^2/g$. The primary particulate crystalline has the particle size range. Therefore the specific surface area is determined from the calculated average particle size of the primary particulate crystalline.

It is preferable that the charge control agent further comprises an amount of 0.01 to 1.00% by weight of butanol. When the charge control agent is prepared using butanol, the average particle size thereof is fine. It is guessed that the excellent toner is prepared, because the charge control agent comprising small amount of butanol is difficult to aggregate and easy to disperse into the toner finely.

The charge control agent has allowable residual sulfate ion wherein an amount thereof is at most 100 ppm preferably. Further the charge control agent has allowable residual chloride ion wherein an amount thereof is at most 200 ppm preferably. The amounts of the ions are measured as the residual ions of the azo-type iron complex salt. The charge control agent having higher purity improves the electrification property more.

It is preferable that two exothermic peaks at 290 degrees centigrade or more are observed by differential thermal analysis: DTA with the charge control agent. It is furthermore preferable that two exothermic peaks ranging from 300 to 360 degrees centigrade and from 400 to 470 degrees centigrade are observed respectively.

The method for manufacturing the charge control agent comprising the azo-type iron complex salt represented by the above chemical formula [VI] of the present invention, comprises steps of:

a diazotization coupling reaction first-step for preparing the monoazo compound represented by the following chemical formula [V]

[V]

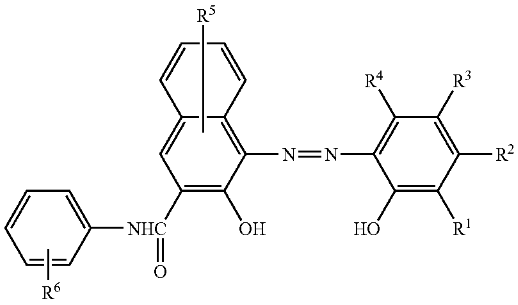

(in the chemical formula [V], $R^1$—, $R^2$, $R^3$—, $R^4$—, $R^5$— and $R^6$— are same above):

a iron-complexing second-step with the monoazo compound for preparing a counter ion to obtain an azo-type iron complex salt represented by above-mentioned azo-type iron complex salt:

a third-step for filtrating and washing with water and drying the azo-type iron complex salt.

It is preferable that iron-complexing is carried out in mixed solvent of a lower alcohol having 1 to 6 carbon atoms and water included at least 70% by weight thereof.

According to the method for manufacturing, reaction rate is fast. And the prepared monoazo compound and the azo-type iron complex salt are obtained with a high yield. The reactants and the products are controlled finely under the each step in the method. Thus controlling is an influential factor to prepare the charge control agent of the aggregate particles comprising the azo-type iron complex salt and the primary particulate crystalline thereof in a good yield. In the method for manufacturing thereof, the reaction is carried out in the mixed aqueous solvent including the lower alcohol having 1 to 6 carbon atoms, to control the particulate crystalline of the azo-type iron complex salt fine in a high yield.

In the second-step, iron-complexing with the monoazo compound and preparing the counter ion may be carried out simultaneously. Iron-complexing with the monoazo compound and following preparing the counter ion may be carried out continuously. As regards the counter ion, preparing whole counter ion of $Na^+$ or $H^+$ and following ion-exchanging the counter ion having the desired ratio of x or y represented by the above-mentioned chemical formula [VI] may be carried out continuously.

Preparing the counter ion is carried out in at least one of aqueous solvent and non-aqueous solvent. The aqueous solvent is inexpensive. Using the aqueous solvent, the reactants and the products are easy to crystallize. And the particle size of the crystalline thereof is controlled finely.

The first-step and second-step may be carried out in the same reactor continuously. Each step thereof may be carried out in the separate reactors. Each step thereof may be carried out through one-pot operation without removing the reaction mixture.

Whenever completing the reaction of each step, intermediate products may be filtrated out to obtain a wet cake, or then the cake may be dried to obtain a dry cake. The wet or dry cake may be used for next steps as the intermediate.

A crucial procedure in the method wherein after the first-step the reaction mixture is taken out and filtrated to obtain the intermediate products of the wet cake, is regulation of the desired amount of the counter ion $Na^+$ of the product of the azo-type iron complex salt. So it is necessary to determine the amount of $Na^+$ of the reaction mixture prepared by the diazotization coupling reaction using for instance sodium nitrite in the first-step, and the residual amount of $Na^+$ of the monoazo compound. The amount of sodium hydroxide is regulated by subtraction of the residual amount of $Na^+$ of the monoazo compound. In the second-step, the sodium hydroxide is added to the mixed solvent of water and the lower alcohol having 1 to 6 carbon atoms dispersing the monoazo compound, and then the iron-complexing agent is added thereto. By the iron-complexing reaction, the azo-type iron complex salt having the desired ratio of the counter ion is prepared simply.

The manufactured charge control agent has fine particle size and uniform shape. So the charge control agent is obtained by a crushing procedure namely a slight pulverizing procedure. It has stable quality sufficiently.

When each step thereof is carried out through one-pot operation without removing the reaction mixture, it is unnecessary that the amount of sodium hydroxide is regulated by subtraction of the residual amount of $Na^+$ of the reaction mixture. In the second-step, the counter ion is controlled by regulating pH of the reaction mixture.

When each step thereof is carried out through one-pot operation without removing the reaction mixture and the reaction mixture of the second-step is acidic, the counter ion is mainly $H^+$ and is indicated by $(H^+)_x(Na^+)_{1-x}$ which x of the mole ratio is 0.6 to 0.9. It is preferable that pH of the reaction mixture is 2 to 6 approximately in this case.

On the other hand, when the reaction mixture is basic, the counter ion is mainly $Na^+$ and is indicated by $(H^+)_y(Na^+)_{1-y}$ which y of the mole ratio is 0 to 0.2. It is preferable that pH of the reaction mixture is 8.0 to 13 approximately in this case.

When the lower alcohol having 1 to 6 carbon atoms is used in the second-step, the charge control agent having the fine average particle size is obtained.

When the particulate crystalline is precipitated in the mixed solvent of water and the lower alcohol having 1 to 6 carbon atoms which the ratio by weight of the water: the lower alcohol having 1 to 6 carbon atoms is 99.9:0.1 to 70:30, the charge control agent having the small particle size is obtained. It is preferable that 1.5 to 8.5% by the weight of the lower alcohol is included. It is further preferable that the lower alcohol having 1 to 6 carbon atoms is butanol such as n-butanol and isobutanol.

Examples of the iron-complexing agent are ferric sulfate, ferric chloride and ferric nitrate.

It is preferable that the charge control agent is manufactured by this method.

The charge control agent is used for including into the toner for the electrostatic image development or the powder paint.

The toner for developing the electrostatic image of the present invention comprises the above-mentioned charge control agent and the resin for the toner. Examples of the resin for the toner are a styrene resin, an acrylic resin, an epoxy resin, a vinyl resin and a polyester resin. The toner may comprise colorant, a magnetic material, a fluid improvement agent or an offset prevention agent. The toner may comprise the resin for the toner having high acid value to use for high-speed instruments. It is preferable that the acid value is 20 to 100 mgKOH/g.

The toner comprises, for example 100 weight parts of the resin for the toner, 0.1 to 10 weight parts the charge control agent, and 0.5 to 10 weight parts of the colorant.

The copied images using the negative electrified toner by the friction are vivid and high quality. The toner causes the faster rise speed of the electrification thereof. So the toner develops the electrostatic latent image clearly and forms vivid images of high resolution, not only under high speed copying but also under low speed copying at rotating speed of at most 600 cm/min. The toner has the excellent copying property.

As the colorant in the toner for developing the electrostatic image, known various dyestuffs and pigments are used. Examples of the colorant are organic pigment such as quinophtharone yellow, isoindolinone yellow, perinone orange, perinone red, perylene maroon, rhodamine 6G lake, quinacridone red, anthanthrone red, rose bengale, copper phthalocyanine blue, copper phthalocyanine green and diketopyrrolopyrrole; inorganic pigment such as carbon black, titanium white, titanium yellow, ultramarine, cobalt blue, red iron oxide, aluminum powder, bronze; metal powder. And other examples of colorant are dyestuff or pigment treated with higher fatty acid or synthetic resin. The exemplified colorant may be used solely or plurally with mixing.

For improving the quality of the toner, the additive agent may be added to the toner internally or externally. Examples of the additive agent are the offset prevention agent; the fluid improvement agent such as magnesium fluoride and various metal oxides for example silica, aluminum oxide, titanium oxide; a cleaning auxiliary such as a metallic soap for example stearic acid; particulates of various synthetic resins for example fluorine-contained resin particulates, silicone synthetic resin particulates, styrene-(meth)acrylic synthetic resin particulates, and so on.

After the toner is mixed with carrier powder, it is used for developing by a two-component magnetic brush development method and so on. The carrier powder can be used all the known carrier powder, and is not limited especially. Examples of the carrier powder are the powder of iron or nickel or ferrite whose particle size is ranging from 50 to 200 microns generally, glass beads, the modified powder or beads whose surfaces are coated with an acrylate copolymer, a styrene-acrylate copolymer, a styrene-acrylate copolymer, a silicone resin, a polyamide resin or a fluoroethylene-contained resin, and so on.

The toner is used for the mono-component development method as well as it. On the occasion of preparing of the toner in similar way, the toner is prepared with adding and dispersing ferromagnetic particulates such as the powder of iron or nickel or ferrite and so on. Examples of the development method using the toner are a contact development method and a jumping development method.

Example of the method for manufacturing the toner is so-called pulverization method. This method is specifically as follows. The resin, a mold lubricant consisting of a material having low softening point, the colorant, the charge control agent and so on are dispersed homogeneously by a pressurized kneader, a extruder or a media dispersing machine. It is pulverized mechanically, or pulverized by collision with targets under jet flow, to prepare the pulverized toner having the desired particle size. Particle size distribution thereof is narrowed through the classification process, to prepare the desired toner.

Moreover, the method of manufacturing the polymerized toner is as follows, for example. The mold lubricant, the colorant, the charge control agent, a polymerization initiator and the other additive agent are added to a monomer. It is dissolved or dispersed homogeneously by a homomixer, an ultrasonic disperser and so on, to prepare a monomer composition. The monomer composition is dispersed in water phase including a dispersion stabilizer by the homomixer and so on. When droplets consisting of the monomer composition are attained to the desired particle size of the toner, granulation is stopped. It is kept the condition of the same particle size by the effect of the dispersion stabilizer, or gently stirred to prevent from sedimentation thereof. The polymerization reaction is carried out at 40 degrees centigrade or higher, preferable at 50 to 90 degrees centigrade. In the latter of the polymerization reaction, it may be risen the temperature. In the latter of the polymerization reaction, or after the polymerization reaction, a part of the aqueous solvent may be distilled in order to remove together the unreacted monomer, byproducts and so on. In thus suspension polymerization method, it is preferable that 300 to 3000 weight parts of water as the solvent for the dispersion are used toward 100 weight parts of the monomer composition.

After the polymerization reaction, the prepared toner particles are washed, filtrated out and dried, to obtain the polymerized toner.

An image formation process of electrophotography of the present invention comprises a step for developing the electrostatic latent image on the electrostatic latent image frame by a developer including the toner.

It is preferable that the image formation process of electrophotography may comprise steps of:

a step for forming of a layer absorbing developer that is included the toner on developer-carrier frame, which rotates at most 900 cm/min that is for example arranged to an electrostatic latent image frame with an interstice:

the step for developing the electrostatic latent image by absorbing the toner in the layer on the electrostatic latent image frame.

EMBODIMENT

Figure 1:
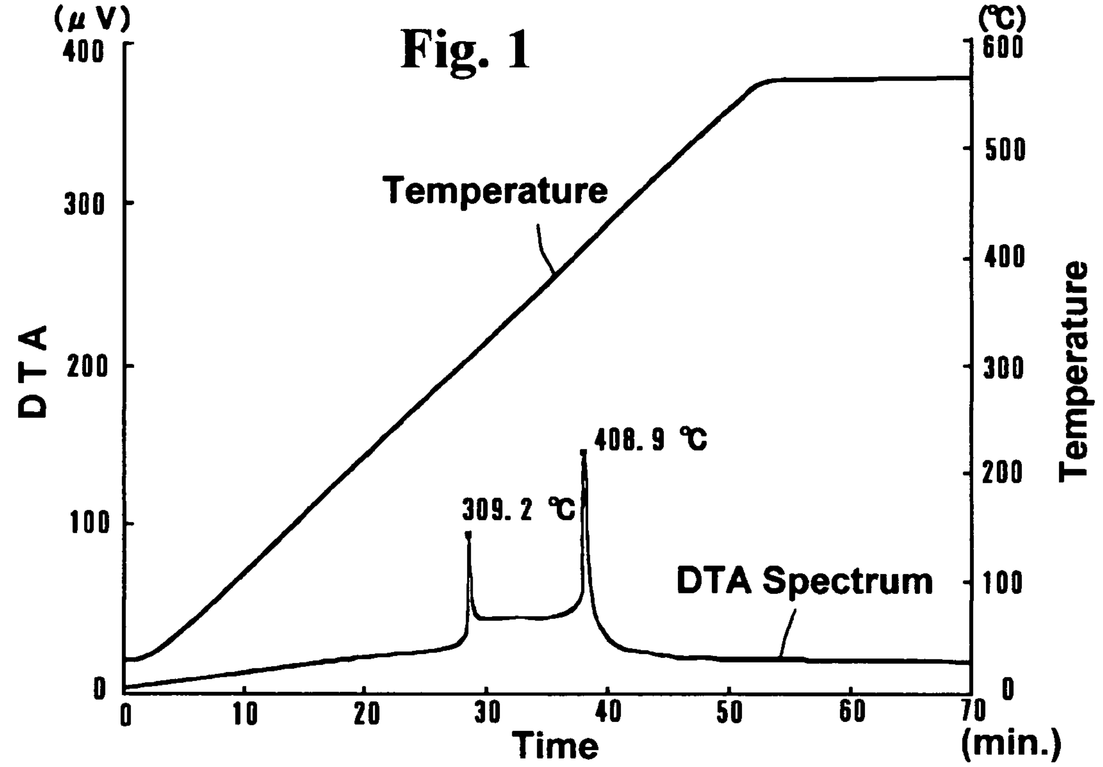
FIG. 1 is a thermal spectrum of the differential thermal analysis of the charge control agent of Example 1 that applies this invention.

Hereunder, embodiments of the charge control agent of this invention and the toner for developing the electrostatic image comprising thereof are explained in detail.

Example 1

The method for manufacturing the charge control agent comprising the azo-type iron complex salt represented by the above chemical formula [III] is explained, referring to the following chemical reaction equations which is an example of synthesizing the complex salt.

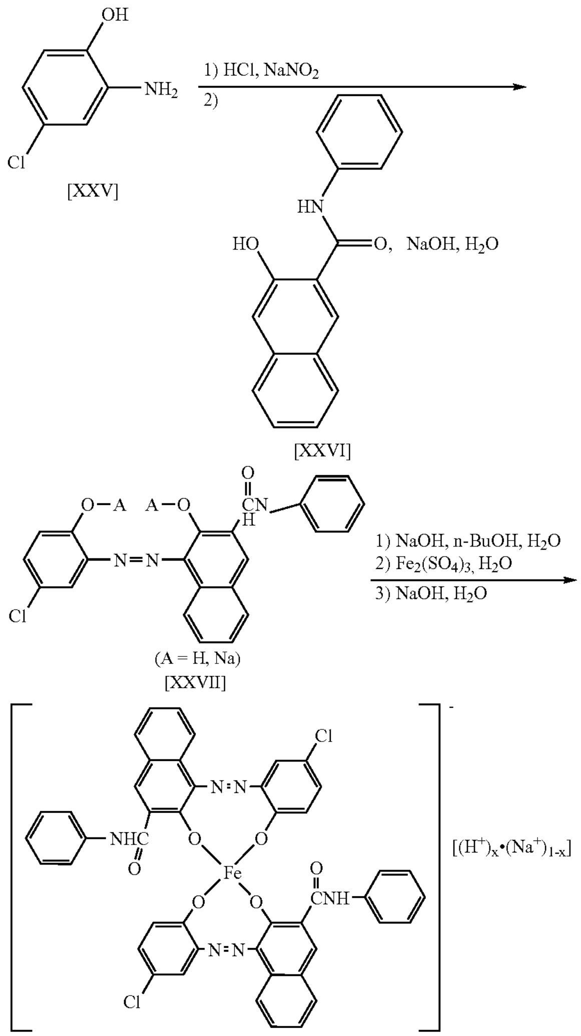

[XXV]

[XXVI]

(A = H, Na)

[XXVII]

[III]

171 g of 2-amino-4-chlorophenol (chemical formula [XXV]) as a starting material and 275 g of concentrated hydrochloric acid were added to 1.3 L of water. For diazotization, 228 g of 36% sodium nitrite aqueous solution was added thereto gradually with cooling a reaction vessel by ice, to obtain the diazonium salt. The diazonium salt solution was added dropwise in a short time to aqueous solution of 263 g of Naphthol AS (chemical formula [XXVI]), 587 g of 20.5% sodium hydroxide aqueous solution and 1960 mL of water, and then it was reacted for 2 hours. The precipitated monoazo compound (chemical formula [XXVII]) was filtrated out and washed with water, to obtain 1863 g of the wet cake having 77.4% of water content.

When 63 g of the wet cake of the monoazo compound (chemical formula [XXVII]) was dried and determined the amount of sodium by atomic absorption spectro photometry, the amount of sodium was 1.56%.

1800 g of the wet cake of the monoazo compound (chemical formula [XXVII]) was dispersed in the mixed solvent of 312 g of normal butanol and 3894 g of water. 226 g of 20.5% sodium hydroxide aqueous solution, that is regulating the amount of residual sodium of the compound as colorant to converted solid weight of the wet cake, was added to the mixed solvent. It was heated at 80 degrees centigrade, and stirred to disperse for 30 minutes. Then 237 g of 41% ferric sulfate aqueous solution was added dropwise. pH of the reaction mixture was 3.3 in this time. It was heated at 93 degrees centigrade, and refluxed for 2 hours, to prepare the azo-type iron complex salt (chemical formula [III]). The precipitated azo-type iron complex salt was filtrated out and washed with water, to obtain 416 g of the desired charge control agent.

The charge control agent was analyzed chemically and evaluated physically.

(The Observation by the Scanning Electron Microscope)

The charge control agent was observed to magnify the particle size and the shape thereof using the scanning electron microscope S2350 that is available from Hitachi, Ltd. It was observed that the charge control agent had uniform shape and the size of the primary particulate thereof was at most 4 microns.

(The Measurement of the Average Particle Size of the Aggregate Particles of the Charge Control Agent)

20 mg of the charge control agent was added to solution of 20 mL of water and 2 mL of an activator: scourol 100 that is available from Kao Corporation, to prepare mixture. Approximately 1 mL of the mixture was add to 120 mL of dispersed water in particle size distribution measurement equipment LA-910 that is available from Horiba, Ltd. After it was irradiated with the ultrasonic wave for 1 minute, the particle size distribution was measured. The average particle size of the aggregate particles of the charge control agent was 2.1 microns.

(The Average Particle Size of the Primary Particulate Crystalline, which the Charge Control Agent was Dispersed Finely)

20 mg of the aggregate particles of the charge control agent was added to solution of 20 mL of water and 2 mL of the activator: scourol 100 that is available from Kao Corporation, to prepare mixture. The mixture was irradiated with the ultrasonic wave for 10 minutes. 1 or 2 droplets of the mixture were added to 120 mL of dispersed water in the particle size distribution measurement equipment. LA-910 that is available from Horiba, Ltd. After it was irradiated with the ultrasonic wave for further 1 minute, to disperse the aggregate particles finely until being the primary particulate crystalline, the particle size distribution was measured. When the result with the measured particle size distribution differs from the result with the observed particle size by the scanning electron microscope awfully, it was irradiated with the ultrasonic wave for further 5 minutes to disperse the aggregate particles more finely until being the primary particulate crystalline and measured the particle size distribution again. The average particle size of the primary particulate crystalline of the charge control agent was 1.7 microns.

(The Measurement of the Specific Surface Area of the Charge Control Agent)

The specific surface area of the charge control agent, that is B.E.T., was measured using specific surface area measurement equipment NOVA-1200 that is available from QUANTACHROME Corporation. After an empty large-cell having 9 mm of the length was weighed, about 0.2 g of the charge control agent was put in to ⅘ of the cell. The cell was set in a drying chamber and heated at 120 degrees centigrade for 1 hour, to degas. The cell was cooled and weighed, to calculate the weight of the charge control agent. The cell was set on the analysis station, to measure. The specific surface area determined from the average particle size of the primary particulate crystalline of the charge control agent was 21.2 $m^2/g$.

(The Measurement of the Amount of Hydrogen Ion and the Amount of Sodium Ion)

The including amount of sodium etc. of the charge control agent were measured using atomic absorption spectro photometer AA-660 that is available from Shimadzu Corporation, and elementary analyzer 2400 II CHNS/O that is available from Perkin Elmer Instruments. As the mole ratio of the counter ions, the hydrogen ion was 76.2 mol % and sodium ion was 23.8 mol %.

(Measurement of the Amount of Residual Chloride Ion and the Amount of Residual Sulfate Ion)

The amount of residual chloride ion and the amount of residual sulfate ion of the charge control agent were measured using ion exchange chromatograph DX-300 that is available from DIONEX Corporation. The amount of residual chloride ion was 181 ppm. The amount of residual sulfate ion was below a limit of the detection that was 100 ppm.

These results are shown in Table 1.

TABLE 1

| Evaluation Criteria | | Example 1 | Example 2 | Example 3 | Example 4 | Example 5 | Example 6 | Comp. Example 1 |
|---|---|---|---|---|---|---|---|---|
| Average Particle | Aggregate Particle | 2.1 | 3.2 | 2.5 | 2.9 | 3.0 | 2.1 | 3.4 |
| Size (micron) | Primary Particle | 1.7 | 1.5 | 1.4 | 1.8 | 1.7 | 1.5 | 2.1 |
| Specific Surface Area ($m^2/g$) | | 21.2 | 18.9 | 23.8 | 17.4 | 18.6 | 20.2 | 8.8 |
| Amount of Residual Chloride Ion (ppm) | | 181 | 168 | 186 | 175 | 159 | 188 | 336 |
| Amount of Residual Sulfate Ion (ppm) | | Below Limit of Detection | Below Limit of Detection | Below Limit of Detection | Below Limit of Detection | Below Limit of Detection | Below Limit of Detection | 766 |

(Measurement of the Amount of the Organic Solvent)

The amount of the organic solvent in the charge control agent was measured using gas chromatograph SERIES II 5890 that is available from HEWLETT-PACKARD Company. The amount of normal butanol was 0.42% by weight.

(Differential Thermal Analysis)

The differential thermal analysis of the charge control agent was carried out using a differential thermal analysis instrument that is available from Seiko Instruments Inc.

These results are shown in FIG. 1. Two exothermic peaks thereof at 309 and 409 degrees centigrade are observed.

(Measurement of the X-Ray Diffraction)

Figure 2:
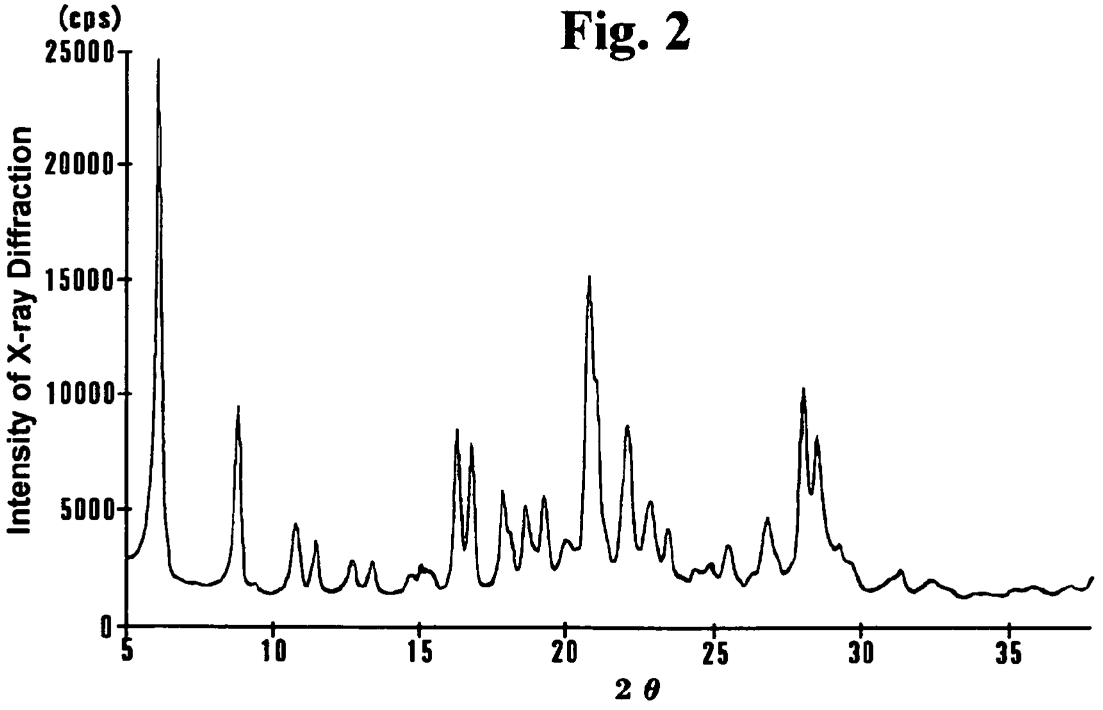
FIG. 2 is an X-ray diffraction spectrum of the charge control agent of Example 1 that applies this invention.

The X-ray diffraction of the charge control agent was measured using an X-ray diffraction instrument MXP18 that is available from Bruker AXS K.K. These results are shown in FIG. 2.

Example 2

174 g of 2-amino-4-chlorophenol (chemical formula [XXV]) as a starting material and 280 g of concentrated hydrochloric acid were added to 1.33 L of water. For diazotization, 233 g of 36% sodium nitrite aqueous solution was added thereto gradually with cooling a reaction vessel by ice, to obtain the diazonium salt. The diazonium salt solution was added dropwise in a short time to aqueous solution of 269 g of Naphthol AS (chemical formula [XXVI]), 600 g of 20.5% sodium hydroxide aqueous solution and 2 L of water, and then it was reacted for 2 hours. 125 g of n-butanol and furthermore 239 g of 41% ferric sulfate aqueous solution were added thereto. It was refluxed for 2 hours to synthesize the azo-type iron complex salt (chemical formula [III]). It was cooled dawn to room temperature. pH of the reaction mixture was 3.2 in this time. The precipitated azo-type iron complex salt was filtrated out and washed with water, to obtain 403 g of the desired charge control agent. The amount of hydrogen ion and the amount of sodium ion of the charge control agent were measured. As the mole ratio of the counter ions, the hydrogen ion was 72.6 mol % and sodium ion was 27.4 mol %. The average particle size of the aggregate particles is shown in Table 1.

Example 3

Another monoazo compound (chemical formula [XXVII]) with the same procedure as Example 1 was prepared. The monoazo compound had 99.00% of purity measured by liquid chromatography and 68.45% of water content. When a small part of the wet cake of the monoazo compound was dried and the amount of sodium thereof was determined by atomic absorption spectro photometry, the amount of sodium was 4.26%.

70.0 g of the wet cake of the monoazo compound was dispersed in the mixed solvent of 11.53 g of 1-pentanol and 424.27 g of water. 7.1 g of 20.5% sodium hydroxide aqueous solution, that is regulating the amount of residual sodium thereof to converted solid weight of the wet cake, was added to the mixed solvent. It was heated at 80 degrees centigrade, and stirred to disperse for 30 minutes. Then 12.76 g of 41% ferric sulfate aqueous solution was added dropwise. pH of the reaction mixture was 2.67 in this time. It was heated at 97 degrees centigrade, and refluxed for 3 hours, to prepare the azo-type iron complex salt (chemical formula [III]). The precipitated azo-type iron complex salt was filtrated out, washed with water and dried to obtain 20.1 g of the desired charge control agent.

The amount of hydrogen ion and the amount of sodium ion of the charge control agent were measured. As the mole ratio of the counter ions, the hydrogen ion was 69.8 mol % and sodium ion was 30.2 mol %. The average particle size of the aggregate particles is shown in Table 1.

Example 4

The monoazo compound represented by the following chemical formula [XXVIII], that had 99.00% of purity measured by liquid chromatography and 68.45% of water content, was prepared as the similar synthetic procedure of the monoazo compound (chemical formula [XXVII]) in Example 1.

[XXVIII]

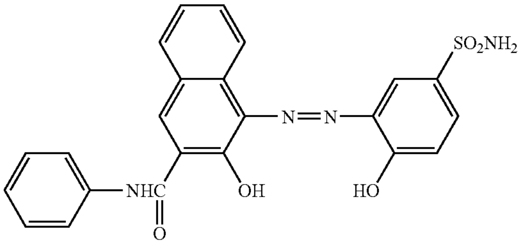

When a small part of the wet cake of the monoazo compound was dried, it had 97.04% of purity measured by liquid chromatography and 58.3% of water content. When the amount of sodium thereof was determined by atomic absorption spectro photometry, the amount of sodium was 4.20%.

57.00 g (0.050 mol) of the wet cake of the monoazo compound was dispersed in the mixed solvent of 24.24 g of normal butanol and 409.02 g of water. 9.37 g (0.048 mol) of 20.5% sodium hydroxide aqueous solution, that is regulating the amount of residual sodium thereof to converted solid weight of the wet cake, was added to the mixed solvent. It was heated at 80 degrees centigrade, and stirred to disperse for 30 minutes. Then 12.24 g (0.013 mol) of 41% ferric sulfate aqueous solution was added dropwise. pH of the reaction mixture was 3.83 in this time. It was heated at 97 degrees centigrade, and refluxed for 3 hours, to prepare the azo-type iron complex salt (chemical formula [X]). The precipitated azo-type iron complex salt was filtrated out, washed with water and dried to obtain 22.3 g of the desired charge control agent.

The amount of hydrogen ion and the amount of sodium ion of the charge control agent were measured. As the mole ratio of the counter ions, the hydrogen ion was 82.3 mol % and sodium ion was 17.7 mol %. The average particle size of the aggregate particles is shown in Table 1.

[X]

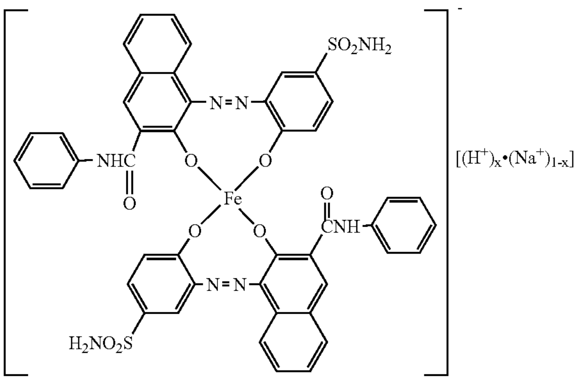

Example 5

16.2 g of 2-amino-4-chlorophenol (chemical formula [XXV]) as a starting material and 26.1 g of concentrated hydrochloric acid were added to 124 mL of water. For diazotization, 21.7 g of 36% sodium nitrite aqueous solution was added thereto gradually with cooling a reaction vessel by ice, to obtain the diazonium salt. The diazonium salt solution was added dropwise in a short time to aqueous solution of 25.0 g of Naphthol AS (chemical formula [XXVI]), 55.9 g of 20.5% sodium hydroxide aqueous solution and 186 mL of water, and then it was reacted for 2 hours. 12.0 g of n-butanol, 18.2 g of 20.5% sodium hydroxide aqueous solution and furthermore 22.7 g of 41% ferric sulfate aqueous solution were added thereto. It was refluxed for 2 hours to synthesize the azo-type iron complex salt (chemical formula [IV]). It was cooled dawn to room temperature. pH of the reaction mixture was 11.8 in this time. The precipitated azo-type iron complex salt was filtrated out and washed with water, to obtain 43.2 g of the desired charge control agent.

The amount of hydrogen ion and the amount of sodium ion of the charge control agent were measured. As the mole ratio of the counter ions, the hydrogen ion was 1.3 mol % and sodium ion was 98.7 mol %. The average particle size of the aggregate particles is shown in Table 1.

Figure 3:
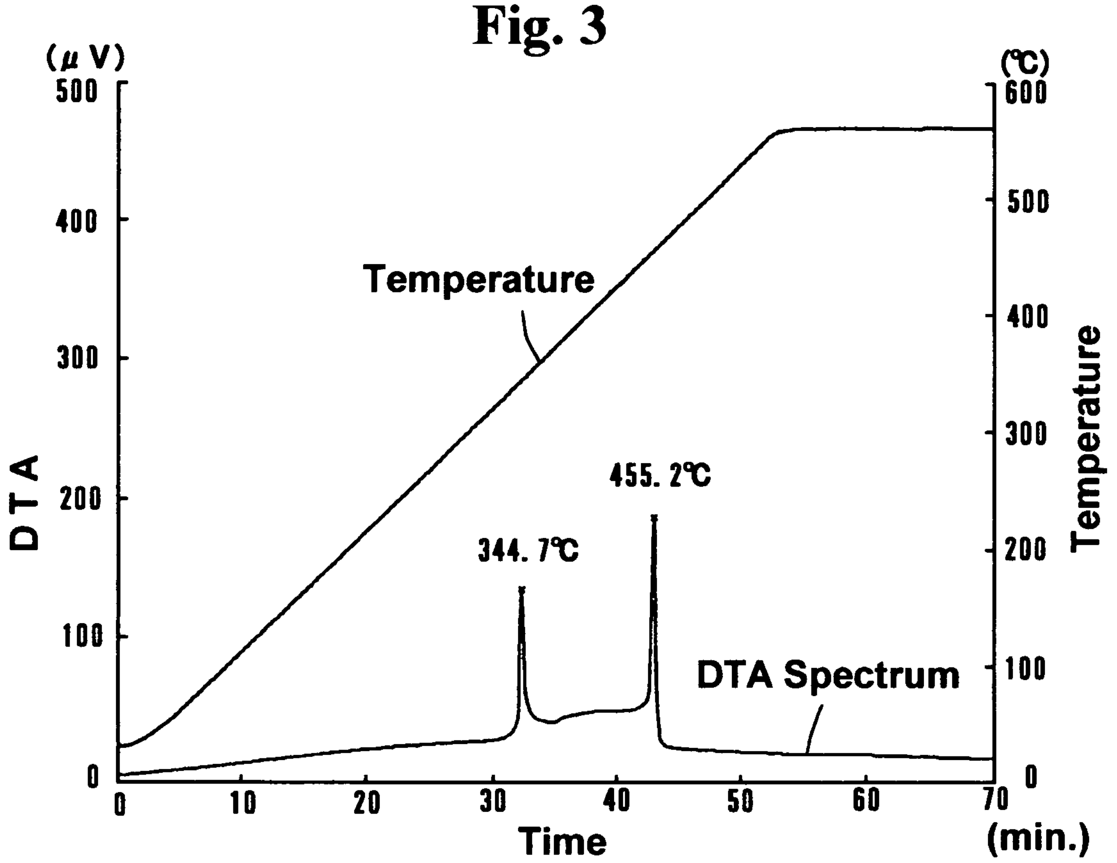
FIG. 3 is a thermal spectrum of the differential thermal analysis of the charge control agent of Example 5 that applies this invention.

The differential thermal analysis of the charge control agent was carried out. Two exothermic peaks thereof at 345 and 455 degrees centigrade are observed. These results are shown in FIG. 3.

Example 6

17.4 g of 2-amino-4-chlorophenol (chemical formula [XXV]) as a starting material and 28 g of concentrated hydrochloric acid were added to 160 mL of water. For diazotization, 23.29 g of 36% sodium nitrite aqueous solution was added thereto gradually with cooling a reaction vessel by ice, to obtain the diazonium salt. The diazonium salt solution was added dropwise in a short time to aqueous solution of 26.86 g of Naphthol AS (chemical formula [XXVI]), 59.96 g of 20.5% sodium hydroxide aqueous solution and 200 mL of water, and then it was reacted for 2 hours. 13.55 g of n-butanol, 9.77 g of 20.5% sodium hydroxide aqueous solution and furthermore 24.38 g of 41% ferric sulfate aqueous solution were added thereto. It was refluxed for 2 hours to synthesize the azo-type iron complex salt (chemical formula [IV]). It was cooled down to room temperature. pH of the reaction mixture was approximately 8 in this time. The precipitated azo-type iron complex salt was filtrated out and washed with water, to obtain 41.9 g of the desired charge control agent.

The amount of hydrogen ion and the amount of sodium ion of the charge control agent were measured. As the mole ratio of the counter ions, the hydrogen ion was 14.7 mol % and sodium ion was 85.3 mol %. The average particle size of the aggregate particles is shown in Table 1.

Comparative Example 1

For comparison to Example 1, a charge control agent: T-77 comprising mainly an ammonium ion as a counter ion that is available from Hodogaya Chemical Co., Ltd. was analyzed chemically and evaluated physically as same as the above. The results are shown in Table 1.

When the particle size and the shape thereof were observed using the scanning electron microscope, it had uneven particle size and irregular shape. The particle size of the primary particulate crystalline was 1 to 5 microns. The specific surface area of the primary particulate crystalline was 8.8 $m^2/g$. As the mole ratio of the counter ions, the ammonium ion was 91.3 mol % and sodium ion was 8.7 mol %. The amount of residual chloride ion was 336 ppm and the amount of residual sulfate ion was 766 ppm as shown in Table 1. The differential thermal analysis thereof was carried out. Only an exothermic peak thereof at 442.9 degrees centigrade is observed.

Hereunder, examples of preparing the toner for developing the electrostatic image using the charge control agent are explained.

Example 7

1 weight part of the charge control agent prepared in Example 1, 100 weight parts of styrene-acrylic copolymer CPR-600B that is available from Mitsui Chemicals, Inc., 6 weight parts of carbon black MA-100 that is available from Mitsubishi Chemical Corporation, and 2 weight parts of low-grade polypropylene VISCOL 550P that is available from Sanyo Kasei Industries, Ltd. were mixed beforehand, to prepare a pre-mix. The pre-mix was melted and kneaded by a heating roller. After cooling, it was crushed coarsely by an ultra-centrifugal pulverizing machine. The obtained coarse pulverulent was fined using an air jet mill attached a classifier, to obtain the black toner having 5 to 15 microns of particle size.

5 weight parts of the toner and 95 weight parts of iron powder carrier TEFV200/300 that is available from Powder Tech Corporation were loaded in three drums respectively. The developing rollers confronted thereof were rotated at rotation speed of (A) 1200 cm/minute, (B) 900 cm/minute, and (C) 600 cm/minute. The quantity of the frictional electrification of the toner with elapsed time was determined by blow-off method using an instrument TB-200, that the blow-off measuring instrument of the quantity of the electrification is available from Toshiba Chemical Corporation. The results are shown in (A) to (C) of FIG. 4.

Example 8

The block toner was prepared as the some as Example 7, except for using the charge control agent of Example 5 instead of the charge control agent of Example 1 in Example 7. The quantity of the frictional electrification was determined by blow-off method. The results are shown in (A) to (C) of FIG. 4.

Comparative Example 2

The black toner of the Comparative Example was prepared as the same as Example 3, except for using the charge control agent T-77 that is available from Hodogaya Chemical Co., Ltd. The quantity of the frictional electrification was determined as same as the above. The results are shown in (A) to (C) of FIG. 4.

Figure 4:
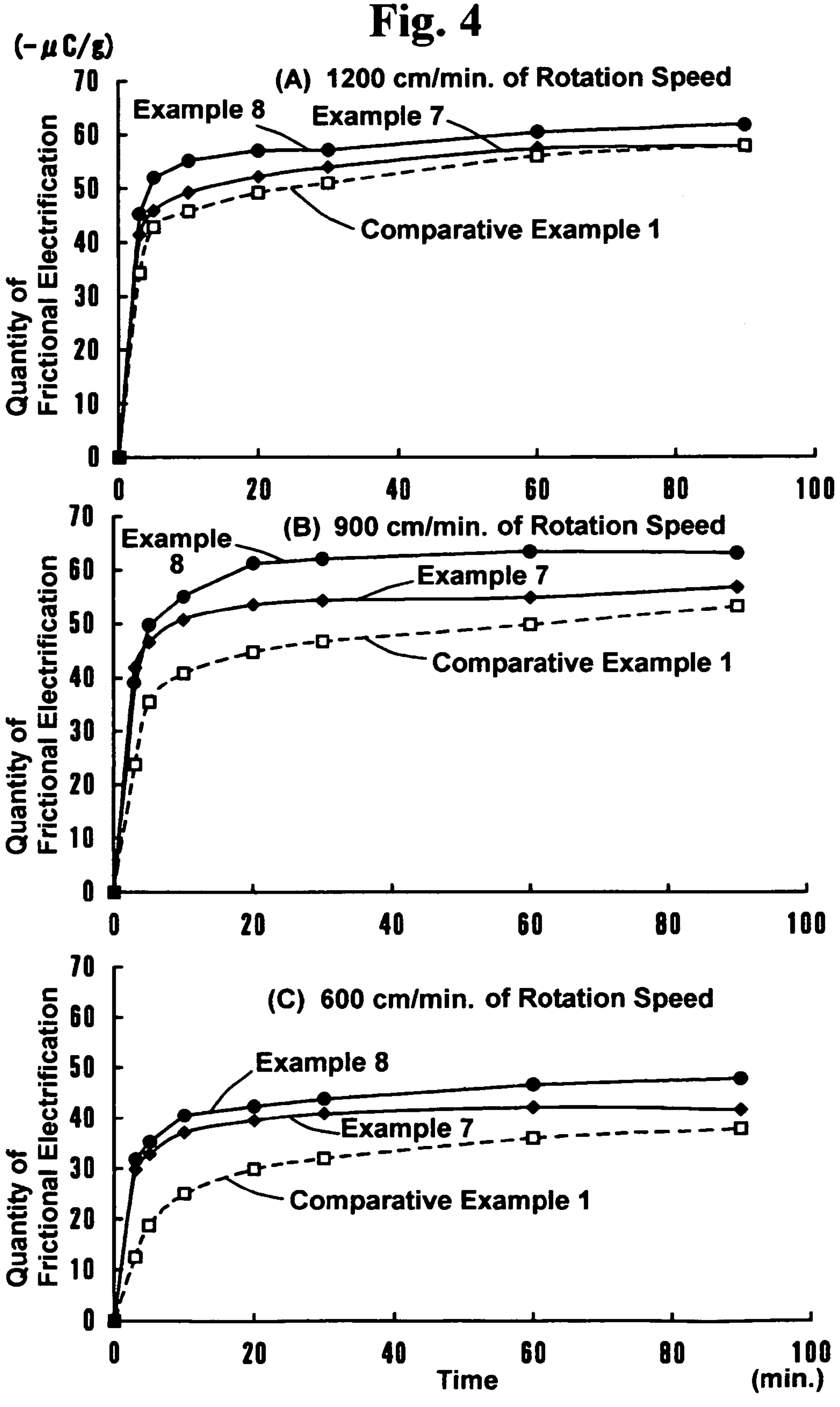
FIG. 4 is a graph shown a correlation between quantity of the frictional electrification of the toner for the electrostatic image development that applies this invention and a rotation time under each rotation speed of a developing roller.

It was evidence with FIG. 4 that the toner of Examples had the fast rise speed of the electrification and the sufficient quantity of the electrification, not only under high rotating speed but also under low rotating speed.

Example 9

After 450 weight parts of 0.1 mol/L $Na_3PO_4$ aqueous solution was added to 710 weight parts of deionized water, it was heated at 60 degrees centigrade. Stirring by 5000 rpm using T.K. HOMO MIXER that is available from Tokushu Kika Kogyo Co., Ltd., 68 weight parts of 1.0 mol/L $CaCl_2$ aqueous solution was added gradually, to prepare water dispersed $Ca(PO_4)_2$.

The other hand, 170 weight parts of styrene monomer, 25 weight parts of carbon, 4 weight parts of the dispersed solution, and 9 weight parts of the azo-type iron complex salt (chemical formula [IIII]) of Example 1 were added to DYNO-MILL ECM-PIROT that is available from Shinmaru Enterprises Corporation. It was stirred to disperse with 0.8 mm of zirconia beads using a stirring blade at 10 m/sec. of peripheral speed for 3 hours, to obtain the dispersed solution. 10 weight parts of 2,2-azobis(2,4-dimethylvaleronitrile) was added to the dispersed solution at 60 degrees centigrade, to prepare the monomer composition.

The monomer composition was added to the water dispersed $Ca(PO_4)_2$. It was stirred at 10000 rpm for 15 minutes, to granulate. Then it was stirred using the stirring blade at 80 degrees centigrade for 10 hours, to polymerize. After the reaction, the unreacted monomer was removed under reduced pressure. After cooling, hydrochloric acid was added to dissolved $Ca(PO_4)_2$. It was filtrated, washed with water, and dried, to obtain the black toner.

5 weight parts of the black toner and 95 weight parts of ferrite carrier were mixed, to obtain the developer. Under the environment of the temperature of 26 to 29 degrees centigrade and the humidity of 55 to 63%, the images were formed using the developer. According to endurance test that is formed images onto 5000 pieces of paper, the initial and final of the images had the same density, high quality, and, no printing except inside.

INDUSTRIAL APPLICABILITY

As it is mentioned above in detail, the charge control agent of the present invention has uniform shape. The suitable fine charge control agent is just obtained by crushing. It is unnecessary to fine-pulverize powerfully using the jet mill and so on. And it is manufactured simply. The charge control agent performs to quicken the rise speed of the electrification and electrify sufficiently. So the charge control agent is used for the toner for the electrostatic image development with widespread purposes of the high or low speed copy. Further the charge control agent is used for the powder paint of the electrostatic powder painting. The charge control agent does not include toxic heavy metals, to have high safety, so that does not cause environmental pollution.

The toner for the electrostatic image development comprising the charge control agent performs to quicken the rise speed of the electrification. The toner causes electrifying sufficient quantity of the negative charge and keeping stable electrification for a long period, because the charge control agent is dispersed homogeneously in the toner. The toner is used for the development of the electrostatic latent image under the image formation process such as the electro photography system. The images, that are formed by transferring the electrostatic latent image onto printing paper, have stability, vividness, high resolution and clearness without foggy.

What is claimed is:

1. A charge control agent comprising:

aggregate particles including an azo-type iron complex salt represented by the following chemical formula [I]

[I]

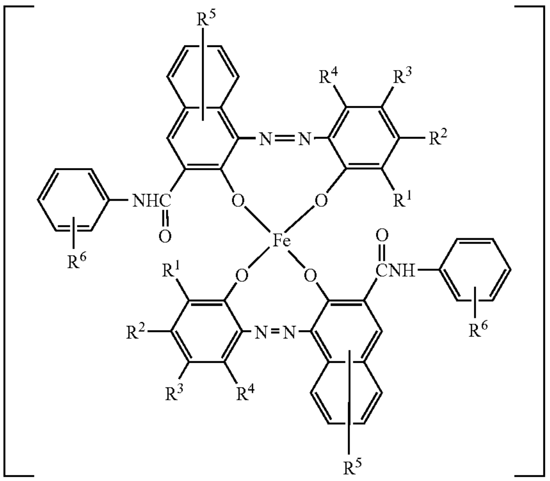

$[(H^+)_x \bullet (Na^+)_{1-x}]$ wherein the chemical formula [I], $R^1$—, $R^2$—, $R^3$— and $R^4$— are same or different to each other, and each one thereof is selected from the group consisting of a hydrogen atom, an alkyl group having a straight or branch chain of 1 to 18 carbon atoms, an alkenyl group having a straight or branch chain of 2 to 18 carbon atoms, a sulfonamide group, a mesyl group, a hydroxyl group, an alkoxyl group having 1 to 18 carbon atoms, an acetylamino group, a benzoylamino group, a halogen atom, a nitro group and an aryl group having no substitutional groups or one or more substitutional groups selected from the group consisting of hydroxyl group, alkyl group, aryl group, and halogen atom $R^5$— is a hydrogen atom, an alkyl group having a straight or branch chain of 1 to 18 carbon atoms, a hydroxyl group or an alkoxyl group having 1 to 18 carbon atoms; $R^6$— is a hydrogen atom, an alkyl group having a straight or branch chain of 1 to 18 carbon atoms, a hydroxyl group, a carboxyl group, a halogen atom or an alkoxyl group having 1 to 18 carbon atoms; x is mole ratio and 0.6 to 0.9;

or the following chemical formula [II]

[II]

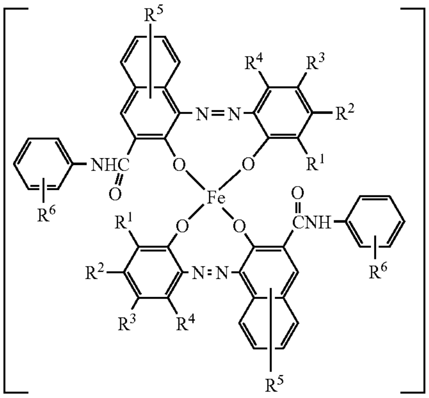

$[(H^+)_y \bullet (Na^+)_{1-y}]$ wherein the chemical formula [II ], $R^1$—, $R^2$—, $R^3$—, $R^4$—, $R^5$— and $R^6$— are the same as in chemical formula [I ]; y is mole ratio and $0<y\leqq 0.2$;

said aggregate particles have 0.5 to 5.0 microns of an average particle size.

2. The charge control agent according to claim 1, wherein the azo-type iron complex salt is a compound represented by the following chemical formula [III ]

[III]

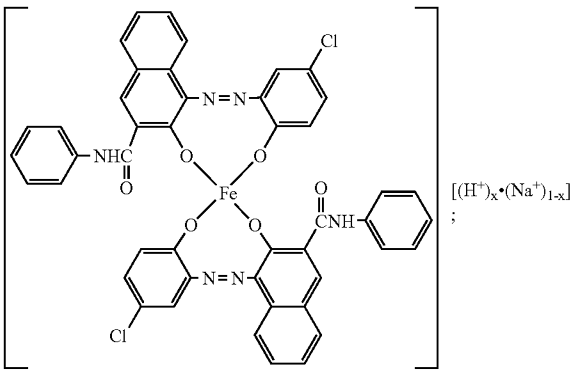

;

or the following chemical formula [IV]

[IV]

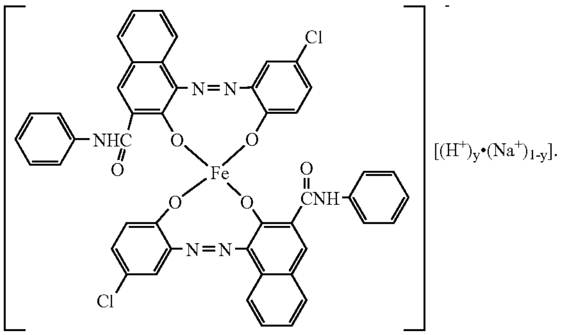

.

3. The charge control agent according to claim 1, wherein the aggregate particles comprise an association of a plurality of crystalline primary particles, and the particle size of the crystalline primary particles is at most 4 microns, wherein the particle size of the crystalline primary particles is measured after fine dispersion of the aggregate particles with ultrasonic vibration.

4. The charge control agent according to claim 3, wherein the specific surface area determined from an average particle size of the crystalline primary particles is at least 10 $m^2/g$.

5. The charge control agent according to claim 1, two exothermic peaks at 290 degrees centigrade or more are observed by differential thermal analysis.

6. The charge control agent according to claim 1, comprising 0.01 to 1.00% by weight of butanol.

7. The charge control agent according to claim 1, wherein allowable residual sulfate ion is at most 100 ppm, and allowable residual chloride ion is at most 200 ppm.

8. A method for manufacturing a charge control agent of aggregate particles including an azo-type iron complex salt comprising:

a diazotization coupling reaction step for preparing monoazo compound represented by the following chemical formula [V]

[V]

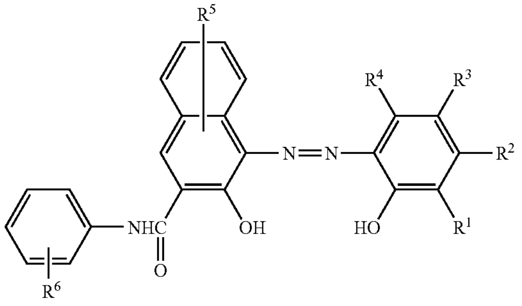

wherein in the chemical formula [V], $R^1$—, $R^2$—, $R^3$— and $R^4$— are same or different to each other, and each one thereof is selected from the group consisting of a hydrogen atom, an alkyl group having a straight or branch chain of 1 to 18 carbon atoms, an alkenyl group having a straight or branch chain of 2 to 18 carbon atoms, a sulfonamide group, mesyl group, a hydroxyl group, an alkoxyl group having 1 to 18 carbon atoms, an acetylamino group, a benzoylamino group, a halogen atom, a nitro group and an aryl group having no substitutional groups or one or more substitutional groups selected from the group consisting of hydroxyl group, alkyl group, aryl group, and halogen atom; $R^5$— is a hydrogen atom, an alkyl group having a straight or branch chain of 1 to 18 carbon atoms, a hydroxyl group or an alkoxyl group having 1 to 18 carbon atoms;$R^6$— is a hydrogen atom, an alkyl group having a straight or branch chain of 1 to 18 carbon atoms, a hydroxyl group, a carboxyl group, a halogen atom or an alkoxyl group having 1 to 18 carbon atoms;

an iron-complexing step with said monoazo compound for preparing a counter ion to obtain the azo-type iron complex salt represented by the following chemical formula [I]

[I]

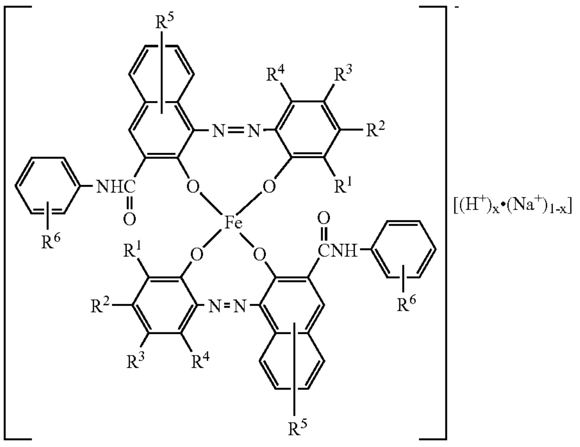

wherein the chemical formula [I], $R^1$—, $R^2$—, $R^3$—, $R^4$—, $R^5$— and $R^6$— are the same as in chemical formula [V]; x is mole ratio and is 0.6 to 0.9;

or the following chemical formula [II]

[II]

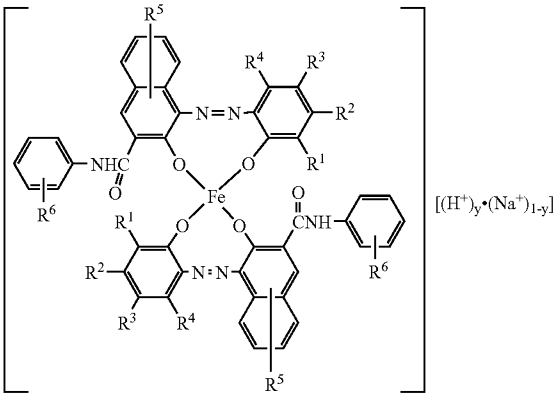

wherein the chemical formula [II], $R^1$—, $R^2$—, $R^3$—, $R^4$—, $R^5$— and $R^6$— are the same as in chemical formula [V]; y is mole ratio and $0<y\leqq 0.2$;

a step for filtrating, washing and drying the azo-type iron complex salt, said iron-complexing step with the monoazo compound is carried out in a mixed solvent of water and 0.1 to 30% by weight of a lower alcohol having 1to 6 carbon atoms.

9. The method according to claim 8, wherein said mixed solvent includes 1.5 to 8.5% by weight of n-butanol.

10. The method according to claim 8, wherein the lower alcohol having 1 to 6 carbon atoms is n-butanol or isobutanol.

11. A charge control agent of aggregate particles including an azo-type iron complex salt manufactured by a method comprising:

a diazotization coupling reaction step for preparing monoazo compound represented by the following chemical formula [V]

[V]

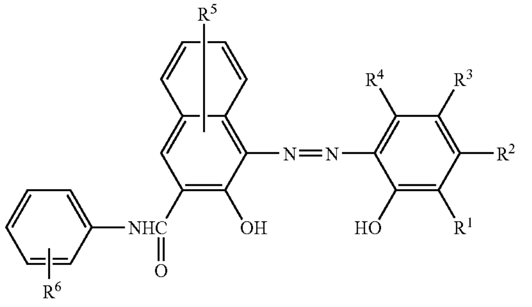

wherein in the chemical formula [V], $R^1$—, $R^2$—, $R^3$— and $R^4$— are same or different to each other, and each one thereof is selected from the group consisting of a hydrogen atom, an alkyl group having a straight or branch chain of 1 to 18 carbon atoms, an alkenyl group having a straight or branch chain of 2 to 18 carbon atoms, a sulfonamide group, a mesyl group, a hydroxyl group, an alkoxyl group having 1 to 18 carbon atoms, an acetylamino group, a benzoylamino group, a halogen atom, a nitro group and an aryl group having no substitutional groups or one or more substitutional groups selected from the group consisting of hydroxyl group, alkyl group, aryl group, and halogen atom; $R^5$— is a hydrogen atom, an alkyl group having a straight or branch chain of 1 to 18 carbon atoms, a hydrogen group or an alkoxyl group having 1 to 18 carbon atoms; $R^6$— is a hydrogen atom, an alkyl group having a straight or branch chain of 1 to 18 carbon atoms, a hydroxyl group, a carboxyl group, a halogen atom or an alkoxyl group having 1 to 18 carbon atoms;

an iron-complexing step with said monoazo compound for preparing a counter ion to obtain the azo-type iron complex salt represented by the following chemical formula [I]

[I]

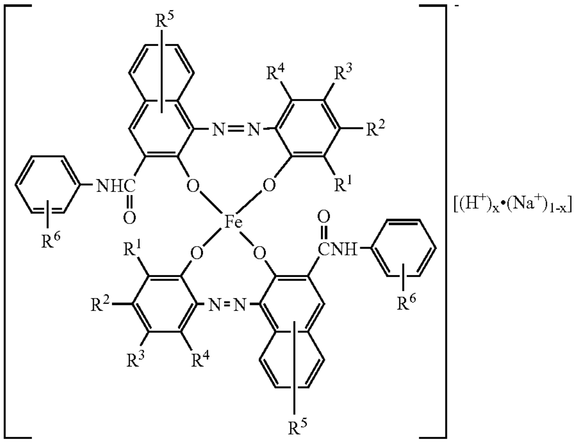

wherein the chemical formula [I], $R^1$—, $R^2$—, $R^3$—, $R^4$—, $R^5$— and $R^6$— are the same as in chemical formula [V ]; x is mole ratio and 0.6 to 0.9;

or the following chemical formula [II]

[II]

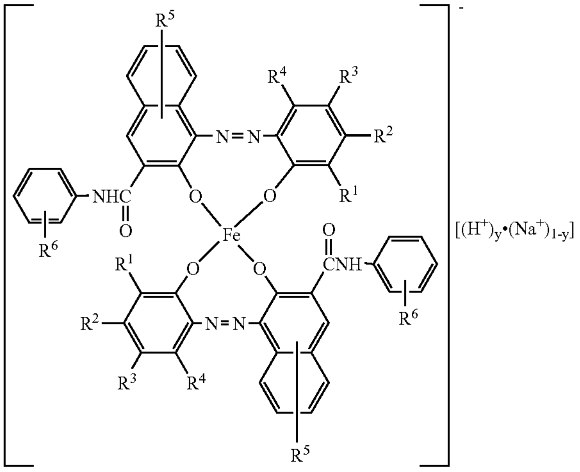

wherein the chemical formula [II], $R^1$—, $R^2$—, $R^3$—, $R^4$—, $R^5$— and $R^6$— are the same as in chemical formula [V ]; y is mole ratio and $0<y\leqq 0.2$;

a step for filtrating, washing and drying the azo-type iron complex salt, said iron-complexing step with said monoazo compound is carried out in mixed solvent of water and 0.1 to 30% by weight of a lower alcohol having 1 to 6 carbon atoms, and said aggregate particles have 0.5 to 5.0 microns of an average particle size.

12. The charge control agent according to claim 11, wherein the lower alcohol having 1 to 6 carbons is n-butanol or isobutanol.

13. A toner for developing an electrostatic image comprising:

a resin for the toner: and a charge control agent of aggregate particles including an azo-type iron complex salt represented by the following chemical formula [I]

[I]

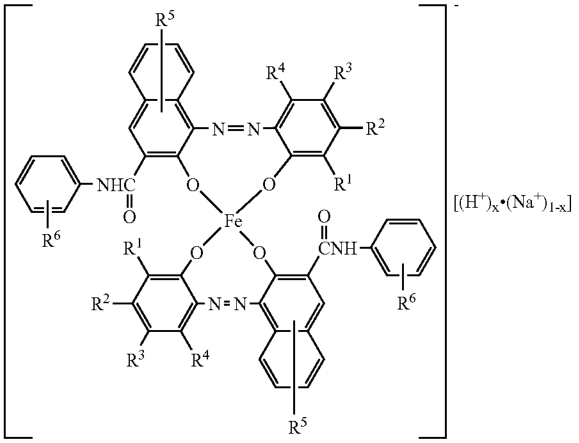

wherein in the chemical formula [I], $R^1$—, $R^2$—, $R^3$— and $R^4$— are same or different to each other, and each one thereof is selected from the group consisting of a hydrogen atom, an alkyl group having a straight or branch chain of 1 to 18 carbon atoms, an alkenyl group having a straight or branch chain of 2 to 18 carbon atoms, a sulfonamide group, a mesyl group, a hydroxyl group, an alkoxyl group having 1 to 18 carbon atoms, an acetylamino group, a benzoylamino group, a halogen atom, a nitro group and an aryl group having no substitutional groups or one or more substitutional groups selected from the group consisting of hydroxyl group, alkyl group, aryl group, and halogen atom; $R^5$— is a hydrogen atom, an alkyl group having a straight or branch chain of 1 to 18 carbon atoms, a hydroxyl group or an alkoxyl group having 1 to 18 carbon atoms; $R^6$— is a hydrogen atom, an alkyl group having a straight or branch chain of 1 to 18 carbon atoms, a hydroxyl group, a carboxyl group, a halogen atom or an alkoxyl group having 1 to 18 carbon atoms; x is mole ratio and 0.6 to 0.9;

or the following chemical formula [II]

[II]

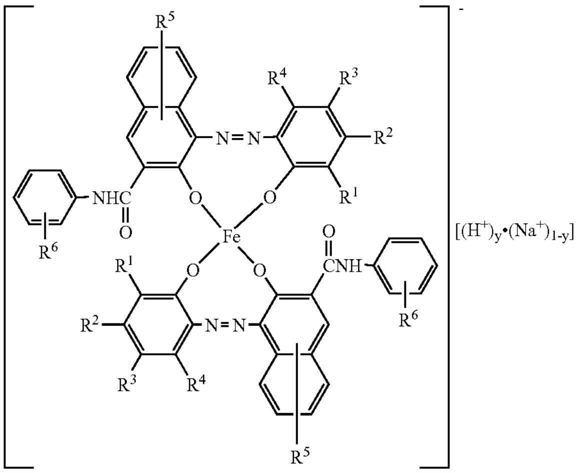

wherein in the chemical formula [II], $R^1$—, $R^2$—, $R^3$—, $R^4$—, $R^5$— and $R^6$— are the same as in chemical formula [V]; y is mole ratio and $0<y\leqq 0.2$;

and said aggregate particles have 0.5 to 5.0 microns of an average particle size.

14. The toner according to claim 13, wherein the azo-type iron complex salt is a compound represented by the following chemical formula [III]

[III]

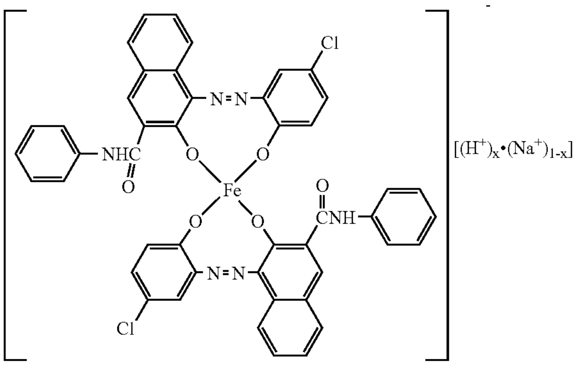

or the following chemical formula [IV]

[IV]

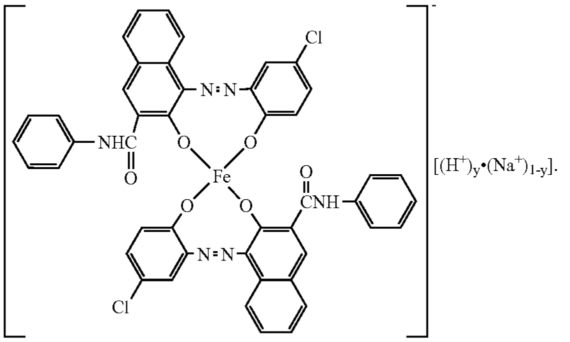

15. The toner according to claim 13, wherein the aggregate particles comprise an association of a plurality of crystalline primary particles, and the particle size of the crystalline primary particles is at most 4 microns, wherein the particle size of the crystalline primary particles is measured after fine dispersion of the aggregate particles with ultrasonic vibration.

16. The toner according to claim 15, wherein the specific surface area determined from an average particle size of the crystalline primary particles is at least 10 $m^2/g$.

17. The toner according to claim 13, wherein two exothermic peaks of the charge control agent at 290 degrees centigrade or more are observed by differential thermal analysis.

18. The toner according to claim 13, wherein the charge control agent comprises 0.01 to 1.00% by weight of butanol.

19. The toner according to claim 13, wherein allowable residual sulfate ion is at most 100 ppm and allowable residual chloride ion is at most 200 ppm in the charge control agent.

20. An image formation process of electrophotography comprising:

developing an electrostatic latent image on an electrostatic latent image frame by a developer including a toner, said toner comprises a resin for the toner and a charge control agent of aggregate particles comprising an azo-type iron complex salt represented by the following chemical formula [I]

[I]

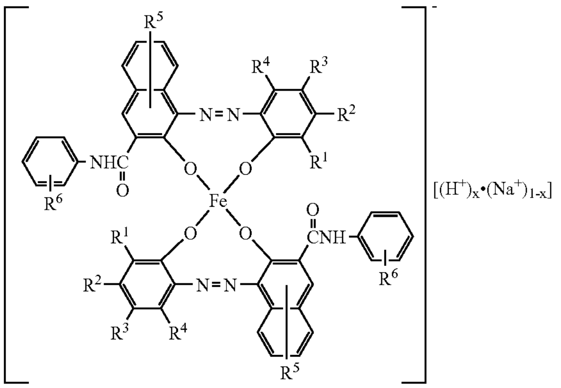

wherein the chemical formula [I], $R^1$—, $R^2$—, $R^3$— and $R^4$— are same or different to each other, and each one thereof is selected from the group consisting of a hydrogen atom, an alkyl group having a straight or branch chain of 1 to 18 carbon atoms, an alkenyl group having a straight or branch chain of 2 to 18 carbon atoms, a sulfonamide group, a mesyl group, a hydroxyl group, an alkoxyl group having 1 to 18 carbon atoms, an acetylamino group, a benzoylamino group, a halogen atom, a nitro group and an aryl group having no substitutional groups or one or more substitutional groups selected from the group consisting of hydroxyl group, alkyl group, aryl group, and halogen atom; $R^5$— is a hydrogen atom, an alkyl group having a straight or branch chain of 1 to 18 carbon atoms, a hydroxyl group or an alkoxyl group having 1 to 18 carbon atoms; $R^6$— is a hydrogen atom, an alkyl group having a straight or branch chain of 1 to 18 carbon atoms, a hydroxyl group, a carboxyl group, a halogen atom or an alkoxyl group having 1 to 18 carbon atoms; x is mole ratio and 0.6 to 0.9;

or the following chemical formula [II]

[II]

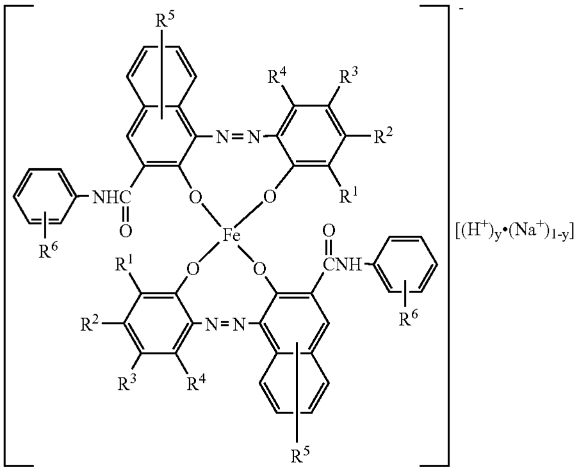

wherein in the chemical formula [II], $R^1$—, $R^2$—, $R^3$—, $R^4$—, $R^5$— and $R^6$— are the same as in chemical formula [I]; y is mole ratio and $0<y\leqq 0.2$;

and said aggregate particles have 0.5 to 5.0 microns of an average particle size.

21. The image formation process according to claim 20, wherein the azo-type iron complex salt is a compound represented by the following chemical formula [III]

[III]

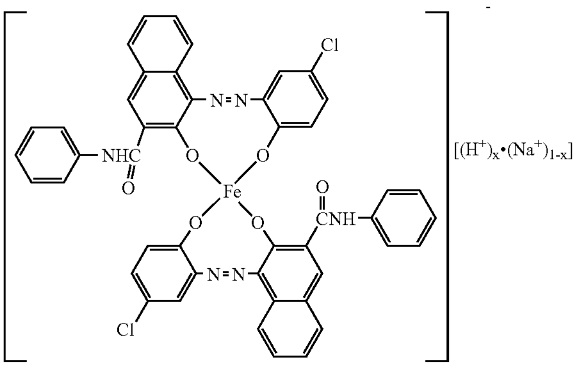

or the following chemical formula [IV]

[IV]

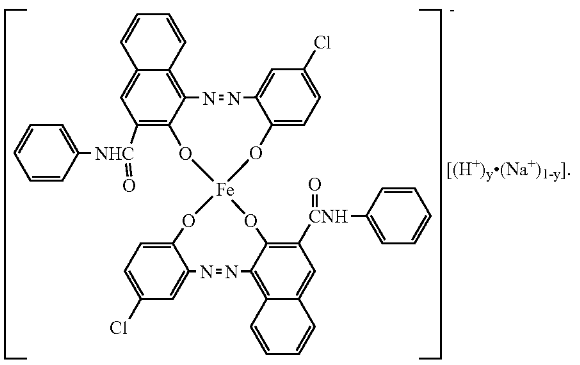

22. The image formation process according to claim 20, wherein the aggregate particles comprise an association of a plurality of crystalline primary particles, and the particle size of the crystalline primary particles is at most 4 microns, wherein the particle size of the crystalline primary particles is measured after fine dispersion of the aggregate particles with ultrasonic vibration.

23. The image formation process according to claim 22, wherein the specific surface area determined from an average particle size of the crystalline primary particles is at least 10 $m^2/g$.

24. The image formation process according to claim 20, further comprising:

forming of a layer absorbing developer that is included the toner on developer-carrier frame, which rotates at most 900 cm/min:

developing the electrostatic latent image by absorbing the toner in the layer on an electrostatic latent image frame.

25. The charge control agent according to claim 1, wherein the azo-type iron complex salt is prepared by a method comprising an iron-complexing step with a monoazo compound, and the iron-complexing step is carried out in a mixed solvent of water and 0.1 to 30% by weight of a lower alcohol having 1 to 6 carbon atoms.

26. The toner according to claim 13, wherein the azo-type iron complex salt is prepared by a method comprising an iron-complexing step with a monoazo compound, and the iron-complexing step is carried out in a mixed solvent of water and 0.1 to 30% by weight of a lower alcohol having 1 to 6 carbon atoms.

27. The image formation process according to claim 20, wherein the azo-type iron complex salt is prepared by a method comprising an iron-complexing step with a monoazo compound, and the iron-complexing step is carried out in a mixed solvent of water and 0.1 to 30% by weight of a lower alcohol having 1 to 6 carbon atoms.

* * * * *